(12) United States Patent
Sakakibara et al.

(10) Patent No.: US 8,986,887 B2
(45) Date of Patent: Mar. 24, 2015

(54) MAGNESIUM SECONDARY BATTERY

(71) Applicant: Denso Corporation, Kariya, Aichi-pref. (JP)

(72) Inventors: Nobuyoshi Sakakibara, Nishio (JP); Kenichirou Kami, Takahama (JP); Norikazu Adachi, Nagoya (JP); Hidehiko Hiramatsu, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/960,065

(22) Filed: Aug. 6, 2013

(65) Prior Publication Data

US 2014/0045071 A1     Feb. 13, 2014

(30) Foreign Application Priority Data

Aug. 8, 2012  (JP) .................................. 2012-176140

(51) Int. Cl.
| | |
|---|---|
| *H01M 4/13* | (2010.01) |
| *H01M 10/054* | (2010.01) |
| *H01M 4/131* | (2010.01) |
| *H01M 4/46* | (2006.01) |
| *H01M 4/02* | (2006.01) |
| *H01M 4/62* | (2006.01) |
| *H01M 4/66* | (2006.01) |
| *H01M 4/74* | (2006.01) |

(52) U.S. Cl.
CPC ............ *H01M 10/054* (2013.01); *H01M 4/466* (2013.01); *H01M 2004/028* (2013.01); *H01M 4/623* (2013.01); *H01M 4/131* (2013.01); *H01M 4/661* (2013.01); *H01M 4/663* (2013.01); *H01M 4/664* (2013.01); *H01M 4/666* (2013.01); *H01M 4/74* (2013.01); *Y02E 60/122* (2013.01)
USPC ...................................................... 429/231.6

(58) Field of Classification Search
CPC  H01M 4/466; H01M 4/623; H01M 2004/028
USPC ........................................................ 429/231.6
See application file for complete search history.

(56) References Cited

U.S. PATENT DOCUMENTS

2012/0028137 A1*    2/2012   Chase et al. .................. 429/405

FOREIGN PATENT DOCUMENTS

| JP | 2003-007357 | 1/2003 |
|---|---|---|
| JP | 2011-171072 | 9/2011 |

OTHER PUBLICATIONS

Office action dated Jul. 3, 2014 in corresponding Japanese Application No. 2012-176140.

* cited by examiner

*Primary Examiner* — Jane Rhee
(74) *Attorney, Agent, or Firm* — Harness, Dickey & Pierce, PLC

(57) ABSTRACT

A magnesium secondary battery includes: a negative electrode for adsorbing and releasing a magnesium ion; a positive electrode for producing a magnesium oxide product in a discharging process; and a non-aqueous magnesium ion conductor disposed between the negative electrode and the positive electrode. The positive electrode includes an accelerator for promoting the magnesium oxide product, which is decomposed to a magnesium ion and an oxygen molecule easier than MgO. In this case, since the electrochemical reaction at the positive electrode in a charging process rapidly progresses, the magnesium secondary battery can charge and discharge repeatedly. Thus, the battery functions as a secondary battery sufficiently.

5 Claims, 3 Drawing Sheets

MAGNESIUM SECONDARY BATTERY

CROSS REFERENCE TO RELATED APPLICATION

This application is based on Japanese Patent Application No. 2012-176140 filed on Aug. 8, 2012, the disclosure of which is incorporated herein by reference.

TECHNICAL FIELD

The present disclosure relates to a magnesium secondary battery.

BACKGROUND

Recently, in view of the environmental problem and energy saving issues, expectations for a hybrid vehicle and an electric vehicle increase. Thus, it is requested to obtain an electric storage device for storing high energy, which is used repeatedly by charging and discharging electricity.

A lithium ion secondary battery is a promising electric storage device. However, a storage energy density in the battery is limited because of the structure of the battery. Another electric storage device, which may show a storage energy density higher than the lithium ion secondary battery, is a metal air battery.

The metal air battery includes a negative electrode for adsorbing and discharging a metal ion and a positive electrode used as active material of oxygen in air. The oxygen in the outside air is supplied to the battery, so that it is not necessary to accommodate the active material in the battery. Thus, the battery may show the high energy density per unit volume. One of the metal air batteries is a lithium air secondary battery having a negative electrode made of metal lithium. For example, JP-A-2003-7357 teaches the lithium air secondary battery.

JP-A-2003-7357 teaches a concrete construction of the non-aqueous type lithium air secondary battery. Further, JP-A-2003-7357 suggests a magnesium air secondary battery including material as a negative electrode active material capable of adsorbing and discharging a magnesium ion and magnesium metal salt as a support salt.

However, JP-A-2003-7357 merely suggests a possibility of the non-aqueous type magnesium air secondary battery. Thus, JP-A-2003-7357 does not describe a concrete, construction of the magnesium air secondary battery. Actually, when the present inventors manufacture a magnesium air battery including a negative electrode with metal magnesium as a negative electrode active material and a positive electrode with oxygen as a positive electrode active material, the battery merely functions as a primary battery, so that the battery is not charged although the battery can discharge.

It is necessary to resolve magnesium oxide into a magnesium ion and oxygen by electrochemical reaction when the battery is charged. The magnesium oxide is produced at the positive electrode when the battery discharges. However, in general, since the magnesium oxide (MgO) as mainly produced oxide is not easily decomposed, the battery does not function as the secondary battery.

SUMMARY

It is an object of the present disclosure to provide a magnesium secondary battery, which is capable of charging and discharging repeatedly.

According to an example aspect of the present disclosure, a magnesium secondary battery includes: a negative electrode for adsorbing and releasing a magnesium ion; a positive electrode for producing a magnesium oxide product in a discharging process; and a non-aqueous magnesium ion conductor disposed between the negative electrode and the positive electrode. The positive electrode includes an accelerator for promoting the magnesium oxide product, which is decomposed to a magnesium ion and an oxygen molecule easier than MgO. In this case, since the electrochemical reaction at the positive electrode in a charging process rapidly progresses, the magnesium secondary battery can charge and discharge repeatedly. Thus, the battery functions as a secondary battery sufficiently.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The present inventors have studied a magnesium secondary battery. Specifically, the present inventors focus attention on a feature such that magnesium oxide (MgO) produced at a discharging period is not easily decomposed at a charging period. As a result, the present inventors have found that, when a magnesium oxide product easily decomposed into magnesium ion and oxygen is produced at a positive electrode, the magnesium oxide product is decomposed easily by an electrochemical reaction in a charging process. Thus, the battery functions as a secondary battery.

Specifically, the magnesium secondary battery includes a negative electrode for adsorbing and discharging a magnesium ion, a positive electrode producing magnesium oxide in case of discharging, and a non-aqueous type magnesium ion conductor arranged between the positive electrode and the negative electrode. Further, the battery includes an accelerator for promoting production of a magnesium oxide product, which is easily decomposed into magnesium and oxygen, compared with MgO.

Since the battery includes the accelerator, the magnesium oxide product, which is easily decomposed into magnesium and oxygen, compared with MgO, is produced at the positive electrode in case of discharging. The produced oxide product is easily decomposed in case of charging. In the magnesium secondary battery, the decomposition reaction provides an electrochemical reaction, so that the electrochemical reaction is easily facilitated. Thus, the battery functions as a secondary battery.

Here, the magnesium oxide product, which is easily decomposed into magnesium and oxygen, is defined as MgOx ($1 \leq x \leq 2$). For example, the magnesium oxide product, which is easily decomposed into magnesium and oxygen, may be a mixture of magnesium dioxide ($MgO_2$) and magnesium oxide (MgO). The weight percentage of the magnesium oxide is higher than zero.

In the oxide product defined as MgOx ($1 \leq x \leq 2$), a composition ration of oxygen is larger than stable magnesium oxide MgO. Here, magnesium oxide is defined as MgOx ($x=1$). The oxide product defined as MgOx is easily decomposed because of excess oxygen. As the suffix x increases, the excess oxygen increases. Thus, the magnesium oxide product is much easily decomposed.

In the non-aqueous magnesium secondary battery, a case where the suffix x is equal to two in MgOx of the magnesium oxide product, which is produced at the discharging process, will be explained.

The electrochemical reaction, which is to be promoted at the positive electrode in the charging process, is shown in formula (1).

$$MgO_2 \rightarrow Mg^{2+} + O_2 + 2e- \quad (1)$$

Further, when the oxide product produced in the discharging process is MgO, the electrochemical reaction is shown in formula (2).

$$2MgO \rightarrow 2Mg^{2+} + O_2 + 4e- \quad (2)$$

Here, the magnesium oxide product is produced in the discharging process with using oxygen as the positive electrode active material. In this case, the electrochemical reaction to be promoted at the positive electrode in the discharging process is shown as follows.

$$Mg^{2+} + O_2 + 2e- \rightarrow MgO_2 \quad (3)$$

$$2Mg^{2+} + O_2 + 4e- \rightarrow 2MgO \quad (4)$$

According to the formula (1) and (2), when the magnesium oxide product is $MgO_2$ or MgO, the oxide product discharges an electron so that the magnesium oxide product is decomposed into magnesium ion and oxygen. Thus, when the electron is easily retrieved from the magnesium oxide product, the magnesium oxide product is easily decomposed.

Figure 1:
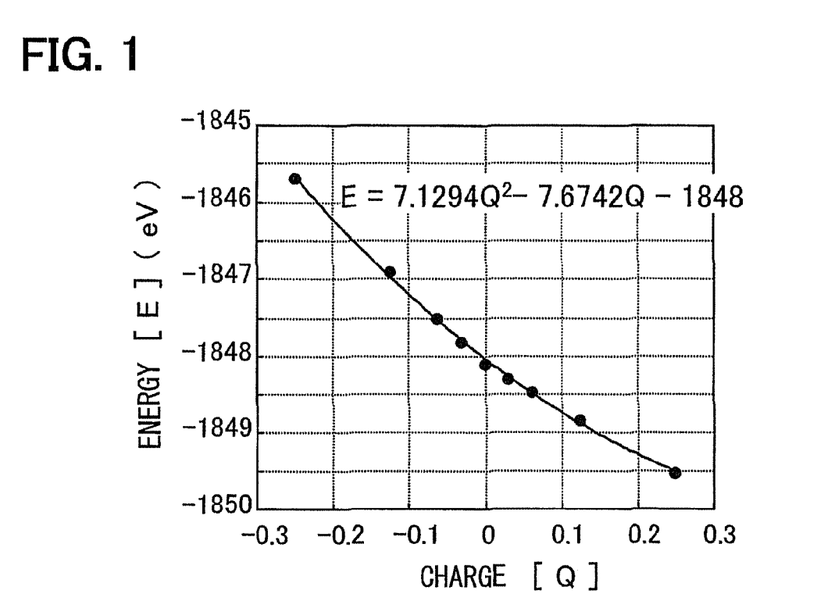
FIG. 1 is a graph showing a calculation result of an ease degree of retrieving an electron from the magnesium oxide product of $MgO_2$.
Figure 2:
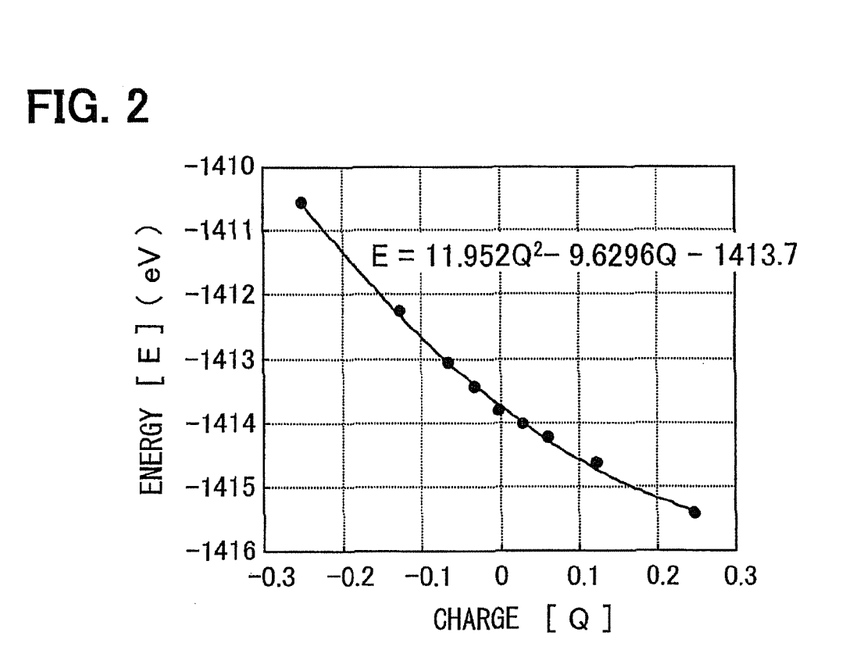
FIG. 2 is a graph showing a calculation result of an ease degree of retrieving an electron from the magnesium oxide product of $MgO_2$.

FIGS. 1 and 2 show calculation results of a degree of retrieving the electron from the product in the charging process, which corresponds to a degree of ease of decomposition. FIG. 1 shows a curve calculated in a case of $MgO_2$, and FIG. 2 shows a curve calculated in a case of MgO. A horizontal axis shows a charge Q of the magnesium oxide product. A vertical axis shows an energy E of the magnesium oxide product. The energy of the magnesium oxide product depends on the charge. The ease degree of decomposition is estimated by a magnitude of a gradient of the curve at a point of zero charge. Specifically, as the gradient is small, i.e., as the curve is mild, the decomposition is easily performed. On the other hand, as the gradient is large, i.e., the curve is steep, the decomposition is not easily performed.

The curve shown in FIG. 1 and relating to $MgO_2$ is represented as a quadratic function (5). When the value Q is zero, the gradient is $-7.6742$.

$$E = 7.1294Q^2 - 7.6742Q - 1848 \quad (5)$$

The curve shown in FIG. 2 and relating to MgO is represented as a quadratic function (6). When the value Q is zero, the gradient is $-9.6296$.

$$E = 11.952Q^2 - 9.6296Q - 1413.7 \quad (6)$$

Accordingly, since the curve corresponding to $MgO_2$ is mild, the magnesium oxide product of $MgO_2$ is decomposed easily, compared with the magnesium oxide product of MgO.

Since the magnesium secondary battery includes the accelerator for promoting production of a magnesium oxide product, which is easily decomposed into magnesium and oxygen, the following electrochemical reaction rapidly progresses.

At the negative electrode in the discharging process, the metal magnesium as the negative electrode active material discharges an electron so that a magnesium ion is produced. Thus, the magnesium ion is soluble in the non-aqueous type magnesium ion conductor. At the positive electrode, the oxygen as the positive electrode active material receives the electron, which is discharged from the magnesium at the negative electrode, through an external circuit so that the oxygen is reduced and ionized. Further, the oxygen ion is combined with, the magnesium ion in the non-aqueous type magnesium ion conductor, so that the magnesium oxide product is formed according to the formula (3). The magnesium oxide product provides a function of the accelerator, and therefore, the magnesium oxide product is easily decomposed in the charging process, compared with a conventional oxide product of MgO.

At the positive electrode in the charging process, the magnesium oxide product is easily decomposed so that the electron is retrieved from the product. Thus, the oxygen ion is oxidized so that the oxygen is formed. Further, the magnesium ion is released to the non-aqueous type magnesium ion conductor according to the formula (1). At the negative electrode, the magnesium ion in the non-aqueous type magnesium ion conductor receives the electron, which is retrieved from the magnesium oxide product, through the external circuit, so that the metal magnesium is formed.

Since the electrochemical reaction at the positive electrode on a latter step in the charging process rapidly progresses, compared with a case where the magnesium oxide of MgO is formed. Thus, the battery functions as the secondary battery.

In the present battery, the magnesium oxide product is defined as MgOx ($1 \leq x \leq 2$). Specifically, the magnesium oxide product may be a mixture of the magnesium dioxide $MgO_2$ and the magnesium oxide MgO. In this case, the weight percentage of the magnesium oxide MgO is higher than zero. Alternatively, the magnesium oxide product may be the magnesium dioxide $MgO_2$.

The oxide product defined as MgOx ($1 \leq x \leq 2$) is easily decomposed to the magnesium ion and the oxygen, compared, with the magnesium oxide MgO. In the present battery, the magnesium oxide product defined as MgOx is produced.

The magnesium oxide product generated in the discharging process is a mixture of the magnesium dioxide $MgO_2$ and the magnesium oxide MgO, the weight percentage of which is higher than zero. Here, the mixture of the magnesium dioxide $MgO_2$ and the magnesium oxide. MgO provides both of the characteristics of the magnesium dioxide $MgO_2$ and the characteristics of the magnesium oxide MgO. Alternatively, the mixture of the magnesium dioxide $MgO_2$ and the magnesium oxide MgO provides mixed characteristics of the magnesium dioxide $MgO_2$ and the magnesium oxide MgO.

Alternatively, the magnesium oxide product may be the magnesium dioxide $MgO_2$ only.

The accelerator may be an oxygen reduction reaction catalyst. The oxygen reduction reaction catalyst provides oxidation action. When the accelerator is the oxygen reduction reaction catalyst, the magnesium oxide product, which is easily decomposed to the magnesium ion and the oxygen, compared with MgO, is formed.

In the present battery, the accelerator arranged in the magnesium secondary battery promotes the production of the magnesium oxide product at the positive electrode in the discharging process, the magnesium oxide product which is easily decomposed in the charging process, compared with MgO. Thus, in the charging process, the magnesium oxide product is easily decomposed into the magnesium ion and the oxygen, so that the electrochemical reaction at the positive electrode rapidly proceeds. Accordingly, the magnesium secondary battery can charge and discharge repeatedly.

The lithium used in a conventional metal secondary battery has many difficulties. For example, the lithium is difficult to handle. When the magnesium is used in the secondary battery, the magnesium is much easily to handle, compared with the lithium. Thus, the magnesium secondary battery provides much sufficient safety.

The Clarke number (i.e., an existing ratio of an element on the earth) of the lithium is 0.006, and therefore, the price of the lithium would increase if the lithium is heavily consumed. On the other hand, the Clarke number of magnesium is 1.93, and therefore, the price of the magnesium is low. Further, the natural resources of magnesium are rich. Thus, compared with lithium, the magnesium is stably supplied with low price.

First Embodiment

The magnesium secondary battery according to an example embodiment includes the accelerator for promoting production of the magnesium oxide product, which is easily decomposed into the magnesium ion and the oxygen, compared with MgO.

A structure of the magnesium secondary battery according to the present embodiment will be explained as follows.

The magnesium secondary battery according to the present embodiment includes the negative electrode for adsorbing and releasing the magnesium ion, the positive electrode for producing the magnesium oxide product in the discharging process with using the oxygen as the positive electrode active material, and the non-aqueous magnesium ion conductor arranged between the negative electrode and the positive electrode. Further, the battery includes the accelerator.

(Accelerator)

The accelerator according to the present embodiment promotes production of the magnesium oxide product, which is easily decomposed into the magnesium ion and the oxygen, compared with MgO, by the electrochemical reaction at the positive electrode in the discharging process.

The magnesium oxide product, the production of which is promoted by the accelerator, may be not limited to a specific product as long as the magnesium oxide product is easily decomposed to the magnesium ion and the oxygen. Specifically, the magnesium oxide product may be made of magnesium and oxygen. Alternatively, the magnesium oxide product may be made of magnesium, oxygen and other elements such as metal element. When the magnesium oxide product is made of magnesium and oxygen, other elements, which do not contribute to an electrode reaction, are not included in the magnesium oxide product.

The magnesium oxide product made of magnesium and oxygen may be defined as MgOx. Since the magnesium oxide product is easily decomposed, compared with MgO, the magnesium oxide product is defined as MgOx, and the suffix x is larger than zero and equal to or smaller than two (i.e., $0 \leq x \leq 2$).

Specifically, the magnesium oxide product, which is easily decomposed, compared with MgO, and produced with using the accelerator, may be magnesium dioxide $MgO_2$. The magnesium dioxide $MgO_2$ is suitably used for various industries, and the magnesium dioxide is rather stable. Further, the magnesium dioxide $MgO_2$ is easily decomposed, compared with the magnesium oxide MgO. Accordingly, the magnesium oxide product produced by the accelerator may be only the magnesium dioxide $MgO_2$.

Alternatively, a part of the magnesium oxide product produced by the accelerator may be the magnesium dioxide $MgO_2$. For example, the magnesium oxide MgO in addition to the magnesium dioxide $MgO_2$ may be produced by the electrochemical reaction at the positive electrode in the discharging process, so that a mixture of the magnesium oxide MgO and the magnesium dioxide $MgO_2$ is formed. Unless a whole, of the magnesium oxide product is the magnesium oxide MgO, the remaining magnesium oxide product provided by the magnesium dioxide $MgO_2$ is decomposed so that the charging process proceeds. Further, almost all of the magnesium oxide product may be the magnesium oxide MgO or the magnesium dioxide $MgO_2$. Thus, the production of the magnesium oxide product, which is easily decomposed to the magnesium ion and the oxygen, is supported.

When the magnesium oxide product is a mixture of the magnesium dioxide $MgO_2$ and the magnesium oxide MgO, a whole of the magnesium oxide product produced in the discharging process is defined as MgOx ($1 \leq x \leq 2$). When the suffix x is large, the magnesium oxide product is more easily decomposed in the charging process, compared with a case of MgO. When the suffix x is equal to or smaller than two, the magnesium oxide product includes the magnesium dioxide $MgO_2$, which is suitable for the decomposition and practical utility.

In each above case, at least the magnesium dioxide $MgO_2$ is produced. Thus, the electrochemical reaction proceeds in the charging process, so that the battery is used as the secondary battery sufficiently. Alternatively, only the magnesium dioxide may be produced, and the amount of the magnesium oxide MgO may be zero.

The accelerator is not limited to a specific one as long as the accelerator promotes production of the magnesium oxide product. The accelerator may be an oxygen reduction reaction catalyst or an oxidation agent. When the accelerator is the oxygen reduction reaction catalyst, the promotion of the production of the magnesium oxide product is sufficient.

The oxygen reduction reaction catalyst may be transition metal oxide including manganese dioxide, cobalt, manganese, or iron. Alternatively, the oxygen reduction reaction catalyst may be platinum group metal such as palladium or platinum, inorganic compound including noble metal oxide, metal coordination organic compound, or peroxide. When the oxygen reduction reaction catalyst is the manganese dioxide, the promotion of the production of the magnesium oxide product is sufficient.

The accelerator may be mixed in the positive electrode. Alternatively, the accelerator may be mixed in the negative electrode. Alternatively, the accelerator may be dispersed in the magnesium ion conductor. In this case, the place, at which the accelerator is arranged, may not be limited to one specific place. Alternatively, the accelerator may be arranged at two places, one being at the positive electrode, and the other being at the negative electrode. When the accelerator is mixed in the positive electrode, the promotion of the production of the magnesium oxide product is sufficient. When the accelerator includes multiple different compounds, the multiple different compounds may be mixed in each of the positive electrode, the negative electrode and the magnesium ion conductor. Alternatively, when the accelerator includes multiple different compounds, each compound may be mixed in a respective one of the positive electrode, the negative electrode and the magnesium ion conductor.

(Positive Electrode)

In the magnesium secondary battery according to the present embodiment, the positive electrode may include the oxygen reduction reaction catalyst as one of the accelerators for promoting the production of the magnesium diode. For example, a catalyst layer including the oxygen reduction reaction catalyst may be arranged on a current collector of the positive electrode.

The positive electrode may be an air electrode with an oxygen gas as the positive electrode active material. Specifically, the positive electrode including the current collector with the catalyst layer is arranged adjacent to a gas chamber for introducing the external air with oxygen such as atmospheric air via a gas diffusion layer for diffusing the oxygen gas to the catalyst layer, so that the positive electrode provides an air electrode. Here, the oxygen gas may be in the external air. Alternatively, the oxygen gas may be supplied from high concentration oxygen container, which is filled by a predetermined method. For example, the oxygen gas may be supplied from pure oxygen gas container.

The catalyst layer includes at least the oxygen reduction reaction catalyst. In view of smooth progression of the electrochemical reaction, the oxygen reduction reaction catalyst and/or the catalyst layer may have high conductivity. In this case, the catalyst may include a conductive member and/or a bonding member for bonding the conductive member and the oxygen reduction reaction catalyst.

The conductive member may not be limited to specific one as long as the conductive member has conductivity. For example, the conductive member may be carbon material or metallic powder. The carbon material is, for example, graphite, acetylene black, ketjen black, carbon black, or carbon fiber.

The bonding member is, for example, polyvinylidene difluoride (PVDF), polytetrafluoroethylene (PTFE), fluorinated ethylene ethylene-propylene copolymer (fluorine resin copolymer), or rubber resin such as ethylene propylene diene monomer (EPDM), styrene-butadiene rubber, and nitrile rubber.

The catalyst layer is formed such that oxygen reduction reaction catalyst powder, granular oxygen reduction reaction catalyst or short fiber oxygen reduction reaction catalyst is mixed with the conductive member and/or the bonding member, and suspended in solvent so that a slurry is formed if necessary, and then, the slurry is applied to one surface or both surfaces of the current collector, and slurry is dried. After the slurry is dried, the current collector may be compressed by a pressing method. The solvent is, for example, organic solvent such as N-Methyl-2-Pyrrolidone (NMP). The solvent is not limited to the NMP.

The gas diffusion layer diffuses the oxygen gas introduced from the gas chamber to the catalyst layer in case of the discharging reaction. The gas diffusion layer diffuses the produced oxygen gas to the gas chamber in case of the charging reaction. The gas diffusion layer may be a conductive sheet made of carbon or the like and having porous property. For example, the gas diffusion layer is a carbon paper, a carbon cloth, or a carbon felt.

The current collector collects current, which is generated by the electrochemical reaction. The material of the current collector is not limited to specific material as long as the material has conductivity. For example, the material of the current collector is nickel, stainless steel, platinum, aluminum, or titanium. The shape of the current collector is, for example, a foil, a plate, or a mesh. In order to secure the diffusion of the oxygen gas, the current collector has a mesh shape.

According to the present embodiment, the battery includes the air electrode, which has the active material of the oxygen gas at the positive electrode so that the energy density per unit volume is improved. Thus, the magnesium secondary battery according to the present embodiment functions as the magnesium air secondary battery sufficiently.

(Negative Electrode)

The negative electrode according to the present embodiment may include a negative electrode active material layer for adsorbing and releasing the magnesium ion.

The active material of the negative electrode is not limited to a specific material. Instead, the active material may be a conventional material. For example, the active material is metallic magnesium. Alternatively, the active material may be metallic material such as magnesium alloy, or a compound for adsorbing and releasing the magnesium ion. Alternatively, the active material may be a combination of these materials.

An accessory component of the magnesium alloy is not limited to a specific component. For example, the accessory component of the magnesium alloy is aluminum, zinc, manganese, silicon, calcium, iron, copper or nickel.

The compound for adsorbing and releasing the magnesium ion is, for example, material having large volume such as graphite. Alternatively, the compound may be made of group 4B metallic element in the short format periodic table, a single body or alloy of half metal such as silicon and tin, or the like. Specifically, the compound may be made of alloy including silicon and/or tin, carbon material such as graphite and amorphous carbon. A single body of these compounds is used as the active material. Alternatively, a combination of these compounds may be used as the active material.

Here, the negative electrode may include an active material layer having the conductive member, and the bonding member in addition to the negative electrode active material. The conductive material may be the same as the positive electrode. For example, when the negative electrode active material is powder, the negative electrode includes the active material layer having the negative electrode active material and the bonding member. When the negative electrode active material, is a foil, the negative electrode includes the active material layer having the negative electrode active material only.

The negative electrode may include the accelerator. For example, the accelerator reacts to the magnesium ion, which is retrieved from the negative electrode in the discharging process, and then, the magnesium oxide product, which is easily decomposed to the magnesium ion and the oxygen compared with MgO, is produced at the positive electrode. However, the production of the magnesium oxide product is not limited to this, feature. For example, the accelerator layer having the accelerator may be arranged in the negative electrode, similar to the active material layer, so that the accelerator layer is formed together with the catalyst layer.

When the active material layer is disposed in the negative electrode, the active material layer may be applied to the current collector so that the negative electrode is formed. The current collector is not limited to a specific one as long as the current collector has the conductivity. The current collector may be made of a foil or a mesh of copper, stainless steel, titanium or nickel. Further, a part of the battery vessel made of these materials may provide the current collector.

(Non-Aqueous Magnesium Ion Conductor)

The non-aqueous magnesium ion conductor in the magnesium secondary battery according to the present embodiment may be disposed between the positive electrode and the negative electrode. Further, the conductor may be non-aqueous electrolytic solution for providing conduction of the magnesium ion between the positive electrode and the negative electrode.

The non-aqueous electrolytic solution is not limited to specific solution as long as the solution provides, a passage of the magnesium ion for moving between the negative electrode and the positive electrode. The non-aqueous electrolytic solution may be conventional solution. For example, the non-aqueous electrolytic solution is solution prepared by dissolving support salt in solvent, ionic liquid, liquid prepared by dissolving support salt in ionic liquid; or the like. Here, the electrolytic solution may be liquid, solid, or gel. For example, the electrolytic solution may be non-aqueous electrolytic solution made of non-proton organic solvent including magnesium salt.

The organic solvent may be one kind or a combination of multiple kinds of conventional non-aqueous electrolytic solutions. For example, the organic solvent may be cyclic ester, chained ester, cyclic ether, chained ether, cyclic carbonate, chained carbonate, or a combination of these solvents.

Specifically, a chained ether compound is, for example, diethylene glycol dimethyl ether. A cyclic ether compound is, for example, tetrahydrofuran. A cyclic carbonate is, for example, ethylene carbonate or propylene carbonate. A chained carbonate is, for example, dimethyl carbonate or diethyl carbonate. When the non-proton organic solvent has high degree of solubility of oxygen, the oxygen dissolved is used effectively for the reaction.

In the battery according to the present embodiment, the support salt is, for example, a conventional support salt such as magnesium chloride ($MgCl_2$), magnesium perchlorate ($MG(Cl_4)_2$), magnesium bis(trifluoromethylsulfonyl) imide ($Mg[N(CF_3SO_2)_2]$), magnesium trifluoromethanesulfonate ($Mg(CF_3SO_3)_2$), magnesium fluorobutanesulfonate ($Mg(C_4F_9SO_3)_2$), or the like.

The ionic liquid is not limited to specific liquid as long as the ionic liquid is used for the non-aqueous electrolytic solution in the secondary battery. For example, a cation component is 1-methyl-3-ethyl imidazolium cation or diethyl methyl (methoxy)ammonium cation. An anion component is, for example, $BF_4^-$ or $(SO_2C_2F_5)_2N^-$.

The accelerator may be diffused in the non-aqueous electrolytic solution. For example, similar to the support salt, the accelerator is dissolved in the non-proton organic solvent, so that the accelerator reacts with the magnesium ion. Thus, the magnesium oxide product, which is easily decomposed into the magnesium ion and the oxygen, compared with MgO, is produced at the positive electrode.

The magnesium secondary battery according to the present embodiment may include other elements in addition to the accelerator, the positive electrode, the negative electrode, and the non-aqueous magnesium ion conductor if necessary. For example, the battery may include a separator for insulating the positive electrode and the negative electrode electrically so that the non-aqueous electrolytic solution is held. In this case, the separator may have dimensions larger than the positive electrode and the negative electrode in order to secure the insulation between the positive electrode and the negative electrode. When the positive electrode and the negative electrode are accommodated in the battery vessel, the separator may be arranged in order to restrict the contact between the battery vessel and each electrode.

The separator is, for example, a porous synthetic resin film such as polyolefin polymer porous film. Specifically, the separator is a poly ethylene polymer porous film or a poly propylene porous film. Alternatively, the separator may be a resin non-woven cloth, a glass fiber non-woven cloth, or the like.

The magnesium secondary battery according to the present embodiment includes the positive electrode as the air electrode. A method for supplying the oxygen as the active material according to the present embodiment is not limited to a method with using the air electrode. Further, as a result of the electrochemical reaction, the magnesium oxide product is produced at the positive electrode in the discharging process, and the magnesium oxide product is decomposed in the charging process so that the electron is discharged and the magnesium ion is released. Thus, the battery functions as a secondary battery. Accordingly, the active material at the positive electrode is not limited to the oxygen. The positive electrode may be a conventional positive electrode such that an active material layer including a predetermined positive electrode active material is arranged in the current collector.

The shape of the magnesium secondary battery is not limited to a specific shape. For example, the shape of the magnesium secondary battery may be a coin shape, a cylindrical shape, a square shape or the like. The vessel of the battery is not limited to a specific vessel. For example, the vessel may be a vessel made of metal or resin, which maintains an outer shape, a soft vessel such as laminate pack, or the like. The battery vessel, may be a open-air type vessel or a closed type vessel when the battery includes the air electrode.

(Manufacturing Method)

The manufacturing method of the magnesium secondary battery according to the present embodiment is not limited to a specific method. The magnesium oxide secondary battery may be formed by a method for manufacturing a conventional non-aqueous electrolytic solution secondary battery. For example, after the positive electrode and the negative electrode are formed, an electrode body prepared by stacking the electrodes via the separator is accommodated in the battery vessel. Then, the non-aqueous magnesium ion conductor is injected.

An example of the magnesium secondary battery will be explained. The magnesium secondary battery is the magnesium air secondary battery, which is provided by a F type electrochemical cell C.

(Current Collector at Positive Electrode Having a Catalyst Layer)

The oxygen reduction reaction catalyst as the accelerator promotes production of the magnesium oxide product, which is easily decomposed into magnesium and oxygen, compared with MgO. The oxygen reduction reaction catalyst is prepared by a catalyst sheet such that 20 parts weight of the manganese dioxide particles (i.e., FMH made by Tosoh Corporation), 70 parts weight of the ketjen black as the conductive element (i.e., KB-ECP600JD made by Ketjen Black International Company), and 10 parts weight of the PTFE powder (i.e., D-2C made by Daikin Industries Ltd.) are mixed and kneaded in a mortar by a dry method. 4 milligrams of the catalyst sheet is press-bonded to a nickel mesh (made by Nilaco Corporation) so that the current collector in the positive electrode with the catalyst layer is formed.

(Negative Electrode)

The negative electrode is made of metallic magnesium having a diameter of 14 millimeters and a thickness of 0.1 millimeters (with 99.9% purity made by Goodfellow Cambridge Limited).

(Preparation of Non-Aqueous Electrolytic Solution)

When the total volume of the non-proton organic solvent is defined as 100%, 15 vol. % of tetrahydrofuran and 85 vol. % of diethylene glycol dimethyl ether are mixed so that the non-aqueous electrolytic solution is prepared. The magnesium chloride is added in the non-proton organic solvent with a magnesium cation concentration of 0.3 mol per liter. Further, ethoxy chloro phenyl complex as boron series anion complex is added in the solvent, so that the non-aqueous electrolytic solution is prepared.

(Assembly of Electrochemical Cell)

Figure 3:
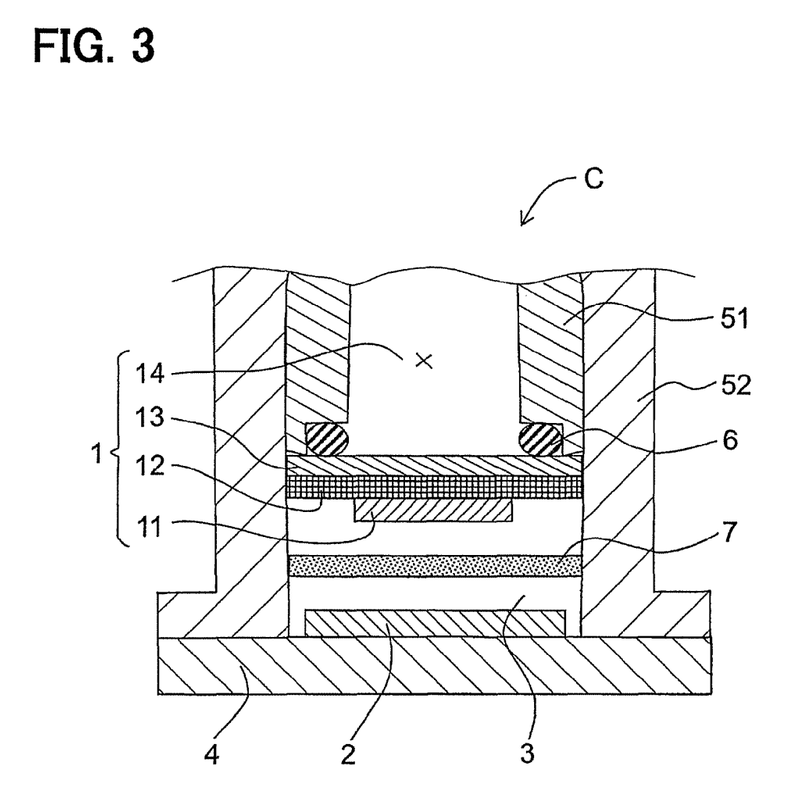
FIG. 3 is a diagram showing a cross sectional view of a F type electrochemical cell according to a first embodiment.

With using the above positive electrode, the negative electrode and the non-aqueous electrolytic solution, the F type electrochemical cell C shown in FIG. 3 is assembled according to the following procedure.

Both sides of the negative electrode are polished with an edge of a glass plate in a glove box under argon atmosphere so that an oxide attached to the surface of the electrode is removed. Then, the negative electrode is arranged on a lower casing 4 made of steel use stainless (SUS).

The current collector 12 of the positive electrode is arranged such that the surface of the catalyst sheet 11 faces the negative electrode 2 via the separator 7 (i.e., GA-55 made by Advantec Toyo Kaisya, Ltd.). Then, the non-aqueous electrolytic solution 3 prepared by the above method is injected between the current collector 12 of the positive electrode and the negative electrode 2.

Then, a carbon paper 13 (EC-TP1-H090T made by Torey Industries, Inc.) is mounted on the current collector 12, and a first upper casing 51 made of SUS is put on the carbon paper 13 via a O ring 6 for sealing. Further, a second upper casing 52 is put on the outside of the first upper casing 51. Then, a lower casing 4 is assembled with the second upper casing 52. Then, a cell is fixed with using a swage tool (not shown). The carbon paper 13 is used as a gas diffusion layer.

Further, a gas chamber 14 provided by a hollow portion in the first upper casing 51 is filled with pure oxygen gas. Then, the gas chamber 14 is sealed. The positive electrode 1 is the air electrode including the current collector 12 with the catalyst sheet 11, the carbon paper 13 covering the upper surface of the current collector 12, and the oxygen gas in the gas chamber 14 contacting the current collector 12 via the carbon paper 13.

The second upper casing 52 includes a terminal (not shown), which is conducted to the positive electrode 1 via a nickel wire press-bonded to the current collector 12, and insulated from the second upper casing 52. Similarly, the lower casing 4 includes a terminal, which is conducted to the negative electrode 2, and insulated from the lower casing 4.

(Comparison)

In a comparison battery, a F type electrochemical cell C' having the current collector 12 of the positive electrode without press-bonding to the catalyst sheet 11 is prepared.

(Evaluation of Battery)
(Charging Amount)

The above F type electrochemical cell C is connected to a charging/discharging device (i.e., HJ1001SM8A made by Hokuto Denko Corp.), so that 5 micro amperes of current (which corresponds to 1.8 mA per unit weight of the positive electrode material, i.e., 1.8 mA/g) flows between the positive electrode 1 and the negative electrode 2. Thus, the cell C discharges with constant current to 400 mAh per unit weight of the positive electrode material, i.e., 400 mAh/g. Then, the polarity of each electrode is switched, so that 5 micro amperes of current flows between the positive electrode 1 and the negative electrode 2. Thus, the cell C charges with constant current to 3.2 volts. Here, the weight of the positive electrode material corresponds to the weight of the catalyst sheet.

Figure 4:
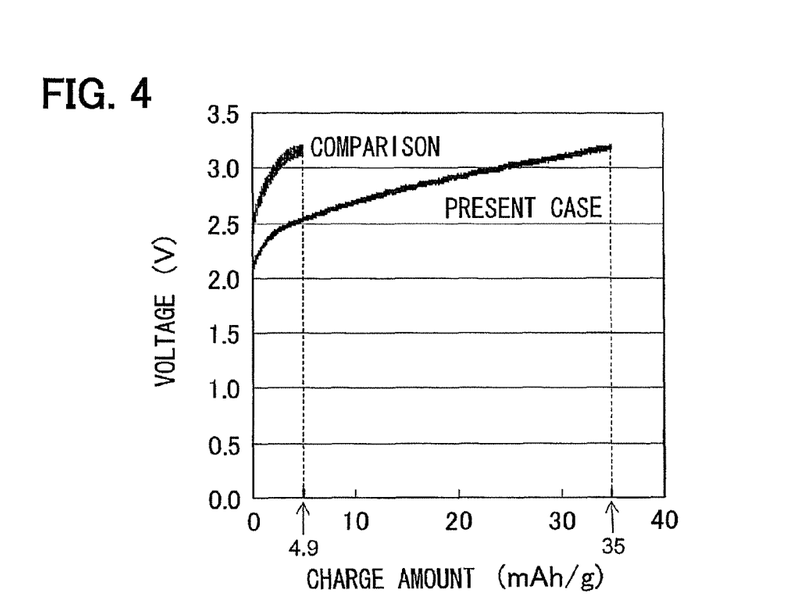
FIG. 4 is a graph showing a charging property of the F type electrochemical cell.

The above charging and discharging experiments are performed in the F type electrochemical cell C according to the present embodiment and the F type electrochemical cell C' as a comparison. The results are shown as the charging curves in FIG. 4. As shown in FIG. 4, the comparison cell C' has the charging amount of 4.9 mAh/g. The present cell C having the positive electrode with the catalyst sheet 11 made of manganese dioxide has the charging amount of 35 mAh/g. Therefore, the charging amount of the present cell C is seven times larger than the comparison cell C'.

Accordingly, although the electrochemical reaction at the positive electrode in the charging process in the comparison cell C' is diminished, the charging amount of the present cell C is sufficiently secured according to the above evaluation result. Thus, the present cell C can charge and discharge repeatedly, so that the present cell C functions as the secondary battery. Specifically, since the production of the magnesium oxide product, which is easily decomposed to the magnesium ion and the oxygen, compared with MgO, is promoted, the electron is discharged from the positive electrode when the decomposition proceeds in case of the charging process, so that the electrochemical reaction is promoted.

(XPS Analysis)

Figure 5:
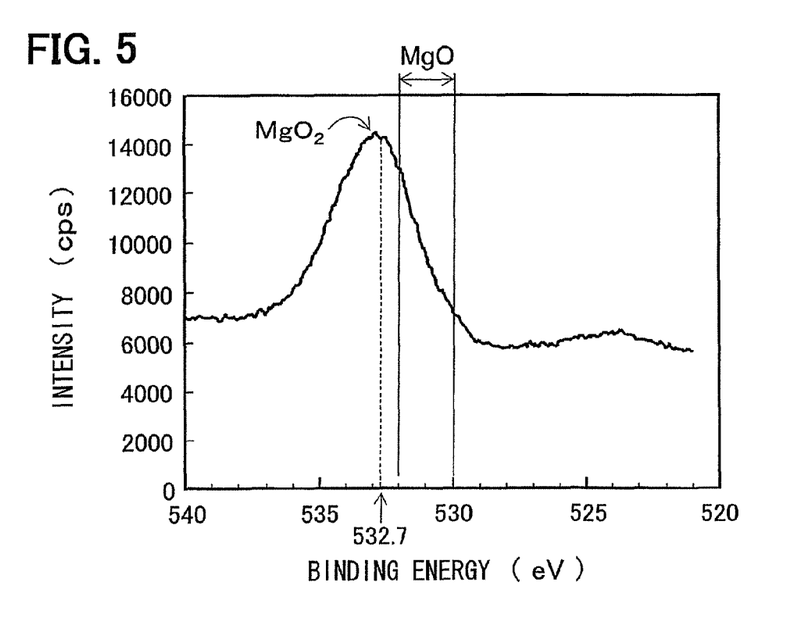
FIG. 5 is a graph showing an experimental result of a XPS analysis of a magnesium oxide product formed at a positive electrode of the F type electrochemical cell.

After the F type electrochemical cell C in the present embodiment discharges with constant current to 400 mAh/g with respect to the positive electrode, the cell C is taken to pieces so that the positive electrode is retrieved from the cell C. The magnesium oxide product deposited on the positive electrode is measured by a XPS (X-ray photoemission spectroscopy) method. Thus, the measurement result is obtained in FIG. 5. The spectrum in FIG. 5 represents a bonding energy of oxygen, which is measured by the XPS method.

In general, the bonding energy between the oxygen and the magnesium in MgO is different from $MgO_2$. The bonding energy in MgO is in a range between 530 eV and 532 eV, in which the oxygen peak appears. Here, the peak at 532.7 eV in FIG. 5 is shifted from the oxygen peak of MgO to a higher energy side. Thus, the magnesium oxide product other than MgO is produced, and the peak at 532.7 eV is supposed to an absorption peak of the oxygen in $MgO_2$. Thus, the manganese dioxide provides catalyst effects, so that the magnesium dioxide $MgO_2$ is produced in the discharging process. However, the spectrum in FIG. 5 does not deny the possible existence of MgO. Thus, it may represent a mixture of MgO and $MgO_2$.

Here, the XPS is measured by an equipment of ESCA5400MC made by Ulvac PHI Inc. The measurement conditions are such that the characteristic X-ray of magnesium is used with a passing energy of 44.75 eV, a step of 0.1 eV, and the number of repeating times of 20 times.

(Analysis of EPMA)

Similarly, after the F type electrochemical cell C in the present embodiment discharges with constant current to 400 mAh/g with respect to the positive electrode, the cell C is taken to pieces so that the positive electrode is retrieved from the cell C. The composition of the magnesium oxide product deposited on the positive electrode is measured by a EPMA (electron probe micro analyzer) method. The composition ratio between the magnesium and the oxygen in the magnesium oxide product produced by the electrochemical reaction in the discharging process is Mg: O=1:1.43. Thus, the magnesium oxide product of $MgO_{1.43}$ (i.e., x=1.43) is produced.

Here, the EPMA is measured by AA-8500F made by JEOL. Ltd. The measurement conditions are such that the acceleration voltage is 15 keV and the beam current is $1 \times 10^{-8}$ A.

In view of the above measurement results, the magnesium oxide product of $MgO_{1.43}$ is produced at the positive electrode since the accelerator, i.e., the oxygen reduction reaction catalyst, is arranged or mixed in the positive electrode.

The magnesium air secondary battery (i.e., F type electrochemical cell C) for producing $MgO_{1.43}$ has charging amount much larger than the comparison magnesium air secondary battery (i.e., F type electrochemical cell C') that produces almost MgO only, which is not easily decomposed. Thus, the magnesium air secondary battery for producing $MgO_{1.43}$ has excellent battery characteristics (i.e., large charging capacity) even when the battery charges and discharges repeatedly. Thus, the present cell C is capable of being used as the secondary battery.

Further, in view of the XPS analysis, the magnesium oxide product of $MgO_{1.43}$ is a mixture of MgO and $MgO_2$. When the magnesium oxide product includes $MgO_2$ largely, the battery characteristics are sufficient. Further, when the magnesium oxide product includes $MgO_2$ only, the battery characteristics are excellent.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A magnesium secondary battery comprising:
   a negative electrode for adsorbing and releasing a magnesium ion;
   a positive electrode for producing a magnesium oxide product in a discharging process; and
   a non-aqueous magnesium ion conductor disposed between the negative electrode and the positive electrode, wherein:
   the positive electrode includes an accelerator for promoting the production of the magnesium oxide product in the discharging process, the magnesium oxide product being decomposed to a magnesium ion and an oxygen molecule easier than MgO in a charging process.

2. The magnesium secondary battery according to claim 1, wherein:
   the magnesium oxide product is defined as $MgO_x$; and
   a suffix of x is larger than 1 and equal to or smaller than 2.

3. The magnesium secondary battery according to claim 1, wherein:
   the magnesium oxide product is a mixture of $MgO_2$ and MgO; and
   a weight percentage of MgO in the magnesium oxide product is equal to or larger than zero.

4. The magnesium secondary battery according to claim 1, wherein:
   the magnesium oxide product is $MgO_2$.

5. The magnesium secondary battery according to claim 1, wherein:
   the accelerator is an oxygen reduction reaction catalyst.

* * * * *